(12) United States Patent
Kudryavtsev

(10) Patent No.: US 11,735,325 B2
(45) Date of Patent: Aug. 22, 2023

(54) ACTUATING MECHANISM OF A SYSTEM FOR THE CONTROL AND PROTECTION OF A NUCLEAR REACTOR

(71) Applicant: STATE ATOMIC ENERGY CORPORATION "ROSATOM" ON BEHALF OF THE RUSSIAN FEDERATION, Moscow (RU)

(72) Inventor: Mikhail Yuryevich Kudryavtsev, Moscow (RU)

(73) Assignee: State Atomic Energy Corporation Rosatom on behalf of the Russian Federation, Moscow (RU)

( * ) Notice: Subject to any disclaimer, the term of this patent is extended or adjusted under 35 U.S.C. 154(b) by 0 days.

(21) Appl. No.: 16/962,489

(22) PCT Filed: Dec. 24, 2018

(86) PCT No.: PCT/RU2018/000855
§ 371 (c)(1),
(2) Date: Jul. 15, 2020

(87) PCT Pub. No.: WO2019/139503
PCT Pub. Date: Jul. 18, 2019

(65) Prior Publication Data
US 2021/0082586 A1      Mar. 18, 2021

(30) Foreign Application Priority Data
Jan. 15, 2018    (RU) .................................. 2018101359

(51) Int. Cl.
*G21C 7/14*      (2006.01)

(52) U.S. Cl.
CPC ...................................... *G21C 7/14* (2013.01)

(58) Field of Classification Search
CPC ........................................................ G21C 7/14
See application file for complete search history.

(56) References Cited

U.S. PATENT DOCUMENTS 3,280,002 A * 10/1966 Hutter ................. G21C 13/028
                                                          277/910
3,344,034 A *  9/1967 Smith ...................... G21C 7/12
                                                         976/DIG. 129

(Continued)

FOREIGN PATENT DOCUMENTS

DE        2741227 A1 *  3/1979
DE        4041350 A1 *  6/1992

(Continued)

*Primary Examiner* — Lily C Garner
(74) *Attorney, Agent, or Firm* — Dentons US LLP

(57) ABSTRACT

Actuator of a nuclear reactor control and protection system comprises: a linear step motor comprising an armature; a rod being coaxial with and connected to the armature to enable joint vertical movement and rotation about a common vertical axis, which rod can form an L-shaped bayonet connection with a working member; and a lock to prevent spontaneous rotation of the rod. The lock comprises a guiding inside the armature and provided with a flange and longitudinal through slot; a cross-member connected to the armature, mounted in the slot and capable of vertical movement therein; a fixed ring, on which the inner surface of the flange rests; and a vertical pin. Through slots are arranged equidistantly in the outside rim of the flange, the vertical pin being mounted in one of several openings arranged equidistantly about the circumference of the fixed ring to pass through one of the through slots.

2 Claims, 2 Drawing Sheets

(56) References Cited

U.S. PATENT DOCUMENTS

| | | | | |
|---|---|---|---|---|
| 3,822,439 | A | * | 7/1974 | Wallin ................ F16H 25/2266 376/234 |
| 4,382,711 | A | * | 5/1983 | Lafosse .................. F16B 21/10 403/290 |
| 5,009,834 | A | * | 4/1991 | Tessaro .................... G21C 7/14 976/DIG. 126 |
| 5,390,222 | A | * | 2/1995 | Rau ......................... G21C 3/32 376/364 |
| 5,793,826 | A | * | 8/1998 | Sato ......................... G21C 7/12 376/228 |
| 2022/0130560 | A1 | * | 4/2022 | Kudryavtsev ............ G21C 7/12 |

FOREIGN PATENT DOCUMENTS

| | | | | |
|---|---|---|---|---|
| EP | 0026142 A1 | * | 4/1981 | |
| EP | 0725405 A1 | * | 8/1996 | |
| GB | 1028886 A | * | 5/1966 | |
| LT | 5049 B | * | 8/2003 | |
| RU | 2526053 C2 | * | 8/2014 | |
| RU | 2562235 C1 | * | 9/2015 | |
| RU | 2563967 C1 | * | 9/2015 | |
| RU | 165684 U1 | * | 10/2016 | |
| WO | WO-9303487 A1 | * | 2/1993 | ............. G21C 3/331 |
| WO | WO-9503612 A2 | * | 2/1995 | ............. G21C 3/334 |

* cited by examiner

ACTUATING MECHANISM OF A SYSTEM FOR THE CONTROL AND PROTECTION OF A NUCLEAR REACTOR

CROSS-REFERENCE TO RELATED DISCLOSURE

This application is a U.S. National Stage of International Application No. PCT/RU2018/000855, filed on Dec. 24, 2018, and published as WO 2019/139503 on Jul. 18, 2019, titled "Actuator of a Nuclear Reactor Control and Protection System," which claims priority to RU 2018101359 filed on Jan. 15, 2018. Each application, publication, and patent listed in this paragraph are hereby incorporated by reference in their entireties.

FIELD OF THE INVENTION

The invention relates to the field of nuclear technology and can be utilized in actuating mechanisms of a system for the control and protection of a nuclear reactor.

BACKGROUND OF THE INVENTION

Most pertinent with respect to the totality of essential features of the disclosed invention is an actuating mechanism of a nuclear reactor control and protection system having a linear step motor with an armature (anchor), a rod arranged coaxially to the armature and being rigidly connected with it for a joint vertical displacement and turning around a vertical axis, being made with the possibility of forming a bayonet joint with a working member, and a lock preventing a spontaneous turning of the rod (Fundamentals of the construction of actuating mechanisms for the control of nuclear reactors (Ru.); I. Ya. Yemelyanov, V. V. Voskoboinikov, B. A. Maslenok; M.: Energoatomizdat, 1987; drawing 3.15 b, p. 41).

In the known actuating mechanism of the system for the control and protection of a nuclear reactor the lock represents a spring-loaded stop in the construction of the lower end of the rod, and the bayonet joint is U-shaped with the possibility of an engagement and disengagement of the rod and the working member by turning the rod about the common vertical axis, wherein a rotation of the working member is constructively excluded. A connection of the rod with the working member is effected by three strokes of the rod (lowering to the stop at the angle of the bayonet joint, turning to the stop at the next angle of bayonet joint, lifting up to the stop in the dead end of the bayonet joint), wherein the spring-loaded stop in the engaged position keeps the rod from exiting the dead end of the bayonet joint to prevent the rotation of the rod towards a disengagement of the bayonet joint with the working member.

The disadvantage of the known actuating mechanism for the control and protection system of the nuclear reactor is the possibility of a spontaneous disengagement of the bayonet connection of the rod and the working member as the result of a failure of the spring-loaded stop due to the hard radiation and the high temperature in the area of the lower end of the rod.

DISCLOSURE OF THE INVENTION

The aim of the present invention is to provide an actuator mechanism of a control and protection system of a nuclear reactor, which makes it possible to simplify the operation of connecting the rod to the working element, and to increase the reliability of the coupling of the rod to the working element under conditions of high temperature and hard radiation.

The technical result of the present invention is the elimination of the spontaneous disengagement of the bayonet connection while simultaneously reducing the number of stroke actions in the coupling-disengagement process.

The technical result is achieved in that in a known actuator mechanism of a nuclear reactor control and protection system which includes a linear step motor with an armature, a rod arranged coaxially to the armature and being rigidly connected to it for a joint vertical displacement and turning around a vertical axis and being made with the possibility of forming a bayonet joint with a working member, and a lock preventing a spontaneous turning of the rod, according to the invention, the bayonet joint is L-shaped, and the lock preventing a spontaneous rotation of the rod comprises a guiding section arranged inside the armature and provided with a flange and a longitudinal through slit, a cross-piece rigidly connected to the armature and mounted in the said slot for the vertical movement in it at a working stroke, a fixed ring on which the inner surface of the flange rests, and a vertical pin, on the outer rim of the flange being provided regularly arranged through slots, and in the fixed ring there are regularly arranged along a circumference openings, in one of which there is a vertical pin passing through one of the through slots of the flange.

Further, the through slots of the flange and the openings of the fixed ring are arranged relative to each other with a difference of angular pitches of not more than 2.degree.

The construction of the lock preventing a spontaneous turning of the rod uses structural elements, which are located above the rod in an area of not very high temperatures and in which radiation is absent, what makes it possible to preserve the initial operational characteristics and thereby increase the reliability of the coupling of the rod with a working element. Further, the aforesaid embodiment of the lock makes it possible to use a two-way bayonet joint, namely of L-shaped type in the claimed invention. In the claimed actuating mechanism for the control and protection system of a nuclear reactor, the rotation to the release position is prevented by the locking of the rotation of the actuator rod, so that the third clutch stroke and the spring-loaded stop, which is present in the known actuator (prototype), are absent in the claimed device.

BEST MODE OF CARRYING OUT THE INVENTION

Figure 1:
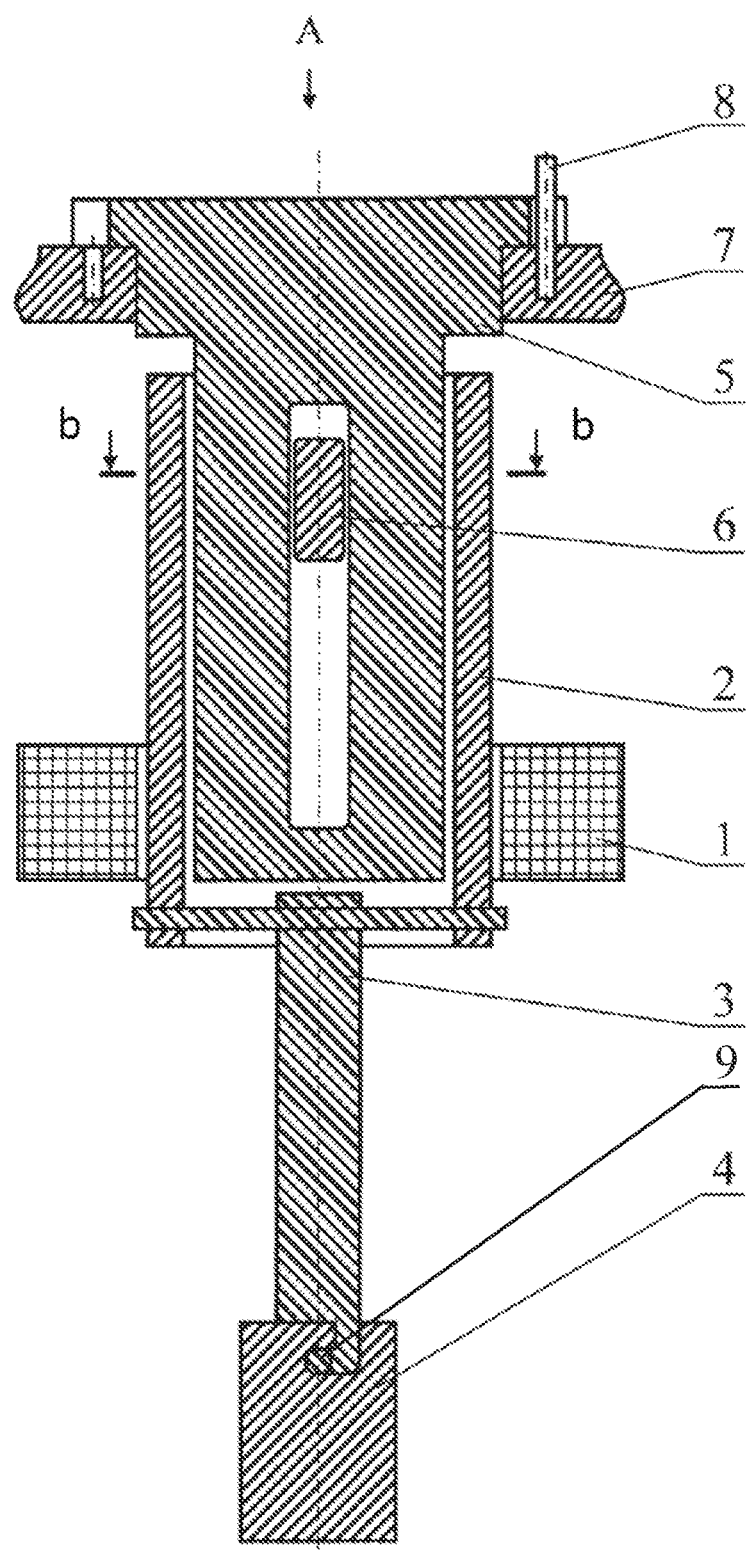
FIG. 1 Is an actuator mechanism of a nuclear reactor control and protection system (overall view, cross-section).
Figure 2:
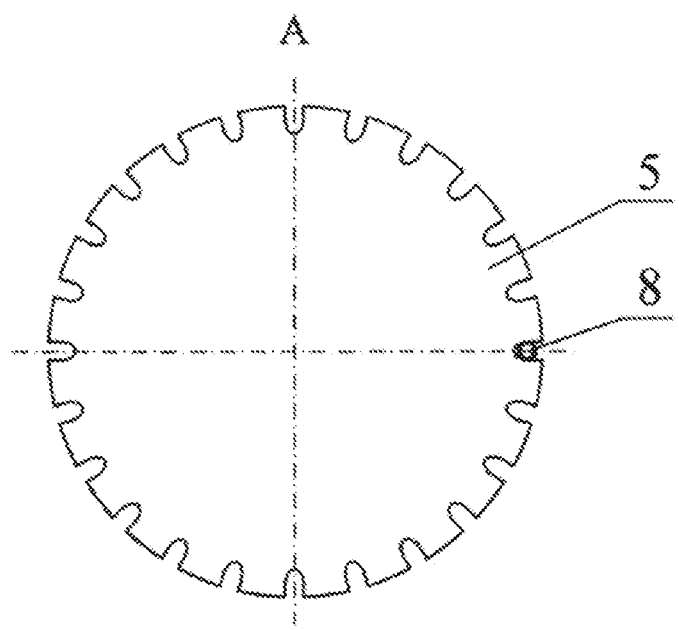
FIG. 2 shows the flange of the guided lock preventing spontaneous rotation of the rod (top view)
Figure 3:
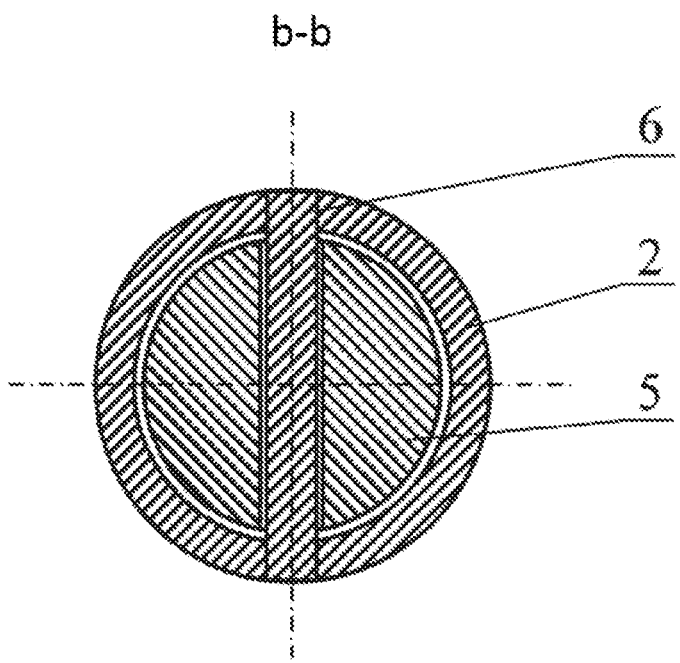
FIG. 3 shows an armature with a cross-piece (Section b-b).

The actuating mechanism of the control and protection system of a nuclear reactor comprises a linear step motor 1 with an armature (anchor) 2 in the form of a vertical tube, a rod 3 installed coaxially to the armature 2 and rigidly connected to it for a joint vertical displacement and turning about a common vertical axis, and a lock preventing spontaneous rotation of the rod 3. The lower end of the rod 3 is connected to the working member 4 by an L-shaped bayonet joint 9. The lock preventing a spontaneous rotation of the rod has a guiding section 5, a cross-piece 6, a fixed (immovable) ring 7 and a vertical pin 8. The guiding 5 is provided with a flange located at its upper end. The lower part of the guiding 5 is located inside the armature 2. The flange of the guiding rests with its inner surface on the fixed ring 7 and is centered with respect to its inner circumference. In the free lower part of guiding 5 there is a longitudinal through slot, in which a cross-piece 6 is installed, which is rigidly fixed to the armature 2 with the possibility of a vertical movement along the slot during a working stroke. Vertical through slots are formed in the outer rim of the flange of guiding 5, which are arranged uniformly over its circumference.

The fixed ring 7 has vertical holes which are arranged uniformly over its circumference. A vertical pin 8 is mounted in one of vertical holes of the fixed ring 7, which passes through one of through slots of the flange of the guiding 5. The through slots of the flange of the guiding 5 and the holes of the fixed ring 7 are arranged relative to each other with a difference of angular pitches of not more than 2.degree.

INDUSTRIAL APPLICABILITY

The actuating mechanism of the control and protection system of a nuclear reactor operates as follows.

The linear step motor 1 moves armature 2 and the rod 3 rigidly connected to the armature 2 and connected with working member 4 by an L-shaped bayonet joint 9 in vertical direction. The vertical displacement of the working member 4 enhances or reduces the nuclear reaction in the nuclear reactor. To connect rod 3 to the working member 4, a vertical pin 8 is pulled out of the armature 2 until rod 3 rests against the angle of the bayonet joint within working member 4, whereafter rod 3 is turned together with armature 2 and the guiding 5 until rod 3 rests in the dead-end of the bayonet joint within working member 4, and then the vertical pin 8 is arranged in a through slot of the flange of guiding 5 and a hole in fixed ring 7. To disengage the rod 3 from the working member 4, the vertical pin 8 is pulled out of the hole in the fixed ring 7, then the rod 3 is turned together with armature 2 and the guiding 5 until the rod 3 rests against the angle (corner) of the bayonet connection within the working member 4, and then the rod 3 is lifted together with the armature 2 until the rod 3 leaves the bayonet connection within the working member 4, and then the vertical pin 8 is inserted through a slot of the flange of the guiding 5 into a hole in the fixed ring 7.

The invention claimed is:

1. An actuating mechanism for a control and protection system of a nuclear reactor, the actuating mechanism comprising:
   a linear step motor with an armature;
   a rod having a first end and a second end, wherein the rod:
      is rigidly connected to the armature at the first end and arranged coaxially with the armature, and
      comprises an L-shaped bayonet at the second end;
   a working element connected to the second end of the rod via the L-shaped bayonet, wherein the rod is configured to adjust a vertical displacement of the working element, and wherein the rod is configured to rotate the working element around a vertical axis;
   a lock comprising a guiding section, a cross-piece, a fixed ring, and a vertical pin, wherein the lock is configured to prevent a spontaneous turning of the rod;
   the guiding section having a flange located at an upper end of the guiding section and a longitudinal through slot in a lower portion of the guiding section, wherein the flange includes at least one through slot, and wherein the lower portion of the guiding section is located inside the armature,
   the fixed ring includes at least one hole, wherein the fixed ring rests against an inner surface of the flange;
   the cross-piece is installed within the longitudinal through slot of the guiding section, wherein the cross-piece is configured to regulate the vertical displacement of the working element; and
   the vertical pin removably mounted through the at least one through slot and into the at least one hole of the fixed ring.

2. The actuating mechanism according to claim 1, characterized in that the at least one through slot of the flange and the at least one hole of the fixed ring are arranged relative to each other with a difference of angular pitches of not more than 2°.

* * * * *